(12) United States Patent
Garg et al.

(10) Patent No.: US 9,451,005 B2
(45) Date of Patent: Sep. 20, 2016

(54) DELEGATION OF RENDERING BETWEEN A WEB APPLICATION AND A NATIVE APPLICATION

(71) Applicant: Microsoft Corporation, Redmond, WA (US)

(72) Inventors: Anupam Garg, Bellevue, WA (US);
Michael Davenport, Seattle, WA (US);
Nickolas Dwayne Welton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 14/048,769

(22) Filed: Oct. 8, 2013

(65) Prior Publication Data
US 2015/0019623 A1  Jan. 15, 2015

Related U.S. Application Data

(60) Provisional application No. 61/846,122, filed on Jul. 15, 2013.

(51) Int. Cl.
G06F 15/16 (2006.01)
H04L 29/08 (2006.01)
G06F 9/50 (2006.01)

(52) U.S. Cl.
CPC ............ *H04L 67/02* (2013.01); *G06F 9/5027* (2013.01); *G06F 2209/509* (2013.01)

(58) Field of Classification Search
CPC ............................................ H04L 67/02
USPC ........................................... 709/203
See application file for complete search history.

(56) References Cited

U.S. PATENT DOCUMENTS

| | | |
|---|---|---|
| 2005/0050449 A1 | 3/2005 | Dehamer et al. |
| 2007/0006238 A1 | 1/2007 | Finger et al. |
| 2007/0089048 A1 | 4/2007 | Lacey et al. |
| 2007/0220083 A1 | 9/2007 | Kothari et al. |
| 2009/0235189 A1 | 9/2009 | Aybes et al. |
| 2012/0221629 A1 | 8/2012 | Zeevi et al. |
| 2012/0221657 A1 | 8/2012 | Zeevi et al. |
| 2012/0324365 A1 | 12/2012 | Momchilov et al. |

(Continued)

FOREIGN PATENT DOCUMENTS

EP  1760584  3/2007

OTHER PUBLICATIONS

PCT Seach Report mailed Nov. 6, 2104 for PCT application No. PCT/US2014/045965, 9 pages.

(Continued)

*Primary Examiner* — Glenford Madamba
(74) *Attorney, Agent, or Firm* — Damon Rieth; Tom Wong; Micky Minhas

(57) ABSTRACT

Concepts and technologies are described herein for transferring an application state between a web control rendered by a native application to native indicators provided by the native application. The web control may be embedded in the native application or may be accessed by the native application. In accordance with some concepts and technologies disclosed herein, an application state control transfers the application state from a web control to a native application. The transfer may occur as a result of a function request received at the native application.

16 Claims, 8 Drawing Sheets

(56) References Cited

U.S. PATENT DOCUMENTS

2013/0139103 A1* 5/2013 Laborczfalvi et al. ....... 715/794
2014/0095589 A1* 4/2014 Johnson ........................ 709/203

OTHER PUBLICATIONS

Barnett, Alex, "ProOnGo: Ushering in the Era of QuickBooks-Compatible Mobile App", Published on: May 18, 2012, Available at: https://developer.intuit.com/blog/2012/05/18/proongo-ushering-in-the-era-of-quickbooks-compatibie-mobile-apps.

"Web Enabling Your Native Apps", Published on: May 2008, Available at: http://www.carrcommunications.com/clips/WebEnableYourNativeApp.pdf.

International Perliminary Preport on Patentability for Application No. PCT/US2014/045965, mailed Oct. 6, 2015, 7 pages.

* cited by examiner

DELEGATION OF RENDERING BETWEEN A WEB APPLICATION AND A NATIVE APPLICATION

CROSS-REFERENCE TO RELATED APPLICATION

This application claims priority to U.S. Provisional Patent Application No. 61/846,122 entitled "Delegation of Rendering Between a Web Application and a Native Application," filed Jul. 15, 2013, which is incorporated herein by reference in its entirety.

BACKGROUND

Web controls embedded in or used by native applications often do not provide a seamless experience. For example, web content displayed in a native application may not have the same look and feel as native controls. Further, interactivity within a web control often feels disjointed, creating a separate experience from the rest of the native application because visual indicators are provided by web content and not the native application.

It is with respect to these and other considerations that the disclosure made herein is presented.

SUMMARY

Concepts and technologies are described herein for transferring application state and rendering control ("application state") between a web control rendered by a native application to native indicators provided by the native application. The "application state" means the "application level" from which information is rendered. The "application level" can include a native application, which may be one level, and an embedded application, such as a web control, which is a different level.

In accordance with some concepts and technologies disclosed herein, the presently disclosed subject matter transfers the application state from a web control rendered by a native application to native indicators provided by the native application when a function request is initiated. When the function request is complete, or at another appropriate time, the application state is transferred back to the web control. In some implementations, the native indicator may be visual, haptic or an audible indicator. In further implementations, when the application state is transferred to the native application, the web control may provide an indicator or other visual information in conjunction with the native indicators provided by the native application.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
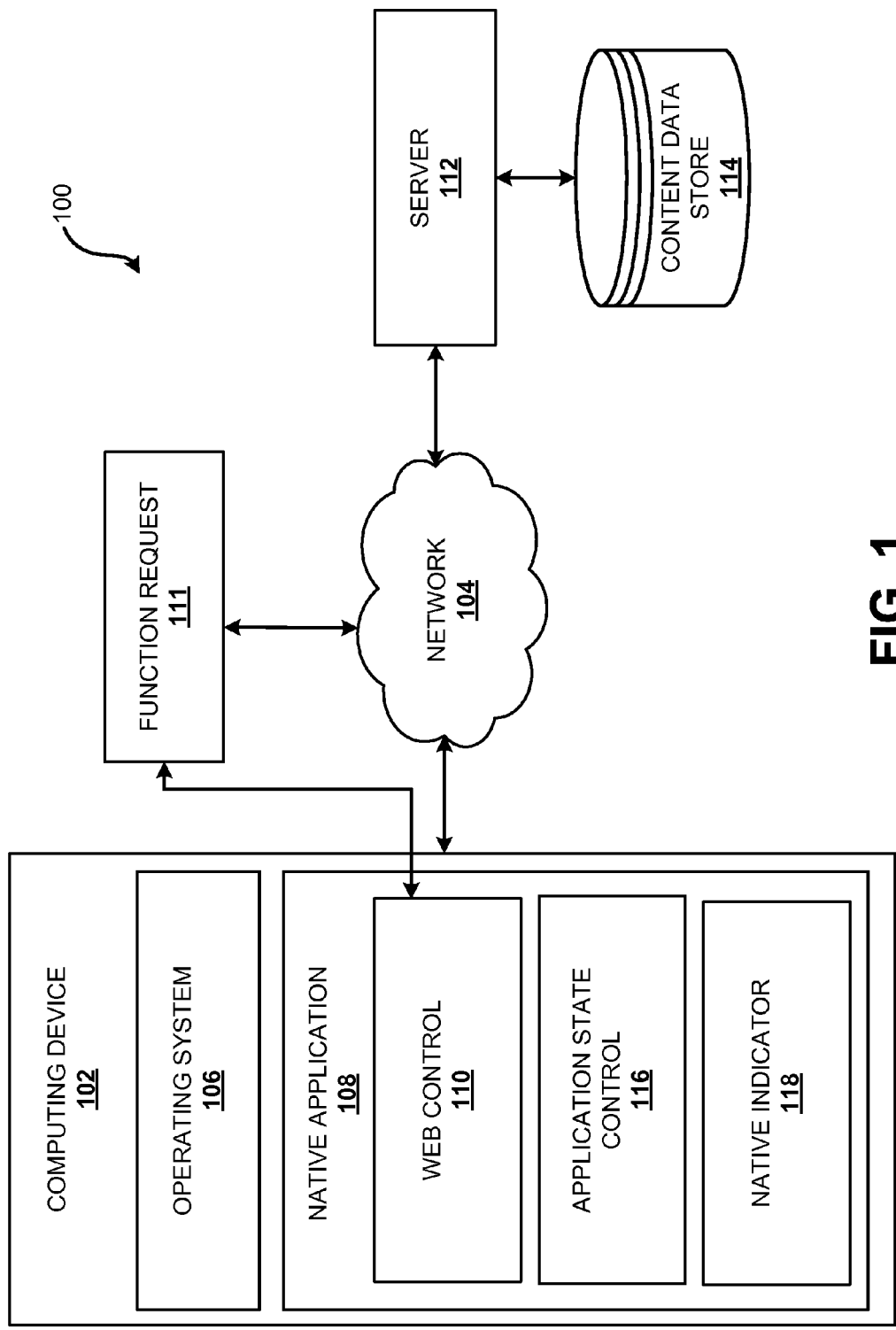
FIG. 1 is a system diagram showing an illustrative operating environment that may be used to implement various embodiments disclosed herein.

The following detailed description is directed to technologies for transferring an application state from a web control, rendered by a native application, to native indicators provided by the native application, and back to the web control, when a function request is initiated. When a function request is transmitted to a remote server providing data to a local computer executing the native application, the application state, which may include visual information presented to a user and rendered in a display, is transferred from the web control to the native application, which provides a native indicator.

Although not limited to any particular benefit, transferring the application state may have several benefits in certain configurations. For example, response time and feedback provided to a user might be more precisely controlled when interacting with web content provided by a remote server. The level of control over the web content itself may be increased as well. Further, the feedback style, such as visual, haptic, and the like, may be modified or tailored to suit the needs or preferences of a user. In addition, the transfer of application state may allow the remote server providing the content and the native application rendering the content through the web control to remain decoupled, yet still provide a relatively seamless level of interaction between the two.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, aspects of a computing system, computer-readable storage medium, and computer-implemented methodologies for transferring application state and other aspects will be presented.

Referring now to FIG. 1, aspects of an operating environment 100 for implementing various embodiments presented herein will be described. The operating environment 100 shown in FIG. 1 includes a computing device 102 operating on or in communication with a network 104. The computing device 102 may be a desktop computer, a laptop computer, a notebook computer, an ultra-portable computer, a netbook computer, or a computing device such as a mobile telephone, a tablet device, a slate device, a portable video game device, or the like. Several illustrative architectures for implementing the computing device 102 are illustrated and described herein below with reference to FIGS. 4-6. It should be understood that the concepts and technologies disclosed herein are not limited to an operating environment connected to a network or any external computing system, as various embodiments of the concepts and technologies disclosed herein can be implemented locally on the computing device 102.

An operating system 106 is executing on the computing device 102. The operating system 106 is an executable program for controlling functions on the computing device 102. The computing device 102 can also execute a native application 108. Although the presently disclosed subject matter is not limited to an application that fits within any one particular definition or term used in any industry, a native application as used herein may refer to an application which is encoded using a specific programming language. Native applications are typically designed to be fast and reliable. Some native applications may be tied to a mobile platform. For example, almost all games created for execution on tablet or smartphone devices are native apps. A native application may be distinguished from other general categories of applications, such as hybrid applications, dedicated web applications, and generic mobile applications.

A hybrid application may be designed to rely on development frameworks. A hybrid application may also be designed to ensure cross-platform compatibility and in such a manner that the hybrid application can access the hardware of the device upon which it is executing, such as a camera. In contrast, a dedicated web application is a web site, usually for mobile devices, that is tailored to a specific platform or form factor.

A generic mobile application may be a web site designed to work with most, if not all, Internet-enabled devices. It should be understood that, although various aspects of the presently disclosed subject matter may be described in terms of a "native" application, the use of the term "native" is not an intent to limit the native application 108 to applications that fit within only one of the categories provided above, as some applications, including the native application 108, may have features that fit within one or more of the categories above.

The native application 108, in some examples, may be, but is not limited to, one or more productivity application programs that are part of the MICROSOFT OFFICE family of products from Microsoft Corporation in Redmond, Wash. Examples of the application programs can include a member of, but are not limited to, MICROSOFT WORD, MICROSOFT EXCEL, MICROSOFT POWERPOINT, MICROSOFT ACCESS, MICROSOFT VISIO, or MICROSOFT OUTLOOK families of application programs. It should be understood that examples provided herein are illustrative, and should not be construed as limiting in any way.

The native application 108 may include a web control 110 that is embedded, integrated into, or accessed by the native application 108. The source code for the web control 110 may be downloaded from a server 112 or other sources, such as the computing device 102, or may be written into the native application 108. Source code or other code consumed by the web control 110 may be written into the web control 110 or may be downloaded from various sources, including the server 112. The web control 110 may be based on various types of languages, such as, but not exclude to, HTML and JAVASCRIPT. It should be understood, however, that the web control 110 may be written in any suitable coding language.

Further, the native application 108 or another suitable entity may augment or modify the web control 110 code to allow various themes to be introduced into the web control 110. For example, a theme may be a visual, audio, or haptic presentation of information designed to invoke a specific response, have a certain visual appearance, or provide information in a certain context. Some examples of themes may be certain layout designs of information, graphics, pictures, fonts, and the like.

The web control 110 may perform various functions. For example, the web control 110 may facilitate the interaction between the native application 108 and the server 112. The server 112 may have access to a content data store 114 that has data stored thereon that may be made available to the native application 108 through the web control 110. A user (not shown) may use the native application 108 to access sales data or other types of data stored in the content data store 114.

The user may initiate the native application 108 at the computing device 102, which may be, among other possibilities, the user's personal or work computer. It should be appreciated that the presently disclosed subject matter is not limited to a single server 112 or the single content data store 114, as illustrated in FIG. 1. In some configurations, the server 112 and the content data store 114 may be devices in a distributed computing environment in which the functions of the server 112 and/or the content data store 114 may be provided by one or more devices.

The native application 108 may receive an input to render data stored in the content data store 114 on the computing device 102. For example, a user in an organization may desire to view sales data stored in the content data store 114 on the computing device 102. It should be appreciated, however, that the presently disclosed subject matter is not limited to an input received from a user, as the input may be received or generated by the native application 108, the web control 110, or other source not specifically delineated herein.

In response to receiving the input, the web control 110 may send a function request 111 to the server 112 requesting data or transmitting information relating to the input. The presently disclosed subject matter is not limited to any type of function for the function request 111. Further, the presently disclosed subject matter does not require an output or input in relation to the function request 111.

The server 112 may process the function request 111 by accessing, among other possible locations or devices, the content data store 114. The server 112 may then transmit a result of the function request 111 to the web control 110 of the native application through the network 104. The web control 110 may then provide the result of the function request 111 to the native application 108. The native application 108 may thereafter process the result for rendering or other purposes depending on the function request 111.

The native application 108 may use various components to render information or data in the native application 108. For example, the native application 108 may use the web control 110 to render the web content provided through the web control 110. The native application 108, when assigning the application state, may also assign a visual level of rendering. For example, the native application 108 may use the web control 110 to render the web content at a relatively high or prominent level to a user. In this example, the web content or user interfaces provided by the web control 110 may be displayed in the foreground, while user interfaces provided by the native application 108 may not be displayed or may be displayed in the background. The web control 110 may have a relatively high visual level (i.e. the foreground), while user interfaces or other data provided by the native application 108 and not the web control 110 may have a relatively low visual level (i.e. the background). It should be understood, however, that the present disclosure is not limited to a foreground/background operation, as other high/low level operations may be used. For example, information rendered in a high visual level may be highlighted, while information rendered in a low visual level may be shaded.

When using data stored remotely, such as data stored in the content data store 114, the visual rendering may be disjointed during a function request 111 operation when the visual rendering is performed using prior methodologies. For example, a user may select a portion of the content provided by the web control 110. If the selection requires a function request 111, the user may be presented with a display provided by the web control 110, yet expect a display commensurate with what would be expected when operating the native application 108.

In the present example, the function request 111 may require data transfer between the content data store 114 and the native application 108. If the data transfer takes an appreciable amount of time, the user may be presented with a screen that appears to be "stuck" or "non-responsive" because of the time it may request to process the function request 111. Thus, while the function request 111 is being processed, the native application 108 may continue to render the content without change because the native application 108 may not be configured to detect the web control 110 action. The embodiments presented herein address these, and potentially other, considerations.

The native application 108 may have an application state control 116. The application state control 116 may control the level of rendering. Using the example above in which an input for a function request 111 was received, the native application 108 or the web control 110 may instruct the application state control 116 to change the application state by transferring the visual level rendered by the native application 108 from the web control 110 to the native application 108. Thus, the native application 108 may render one or more indicators or provide one or more outputs to indicate to the user, or other entity, that a function request 111 is being processed. Transferring the application state from the web control 110 to the native application 108 may provide a level of feedback or information necessary or desired by a user or other entity.

When the application state control 116 is instructed to transfer the application state from the web control 110 to the native application 108, a native indicator 118 may be initiated. An "indicator" is a rendered image used to, among other possibilities, convey information such as the status of an operation. For example, an indicator may be an "in progress" image rendered when a data download or upload is in progress. An indicator that termed "native" is an indicator that is used by, or otherwise associated with, a native application. The native indicator 118 may be initiated by the native application 108, the web control 110, the application state control 116, or other applications not delineated herein. When initiated, the native indicator 118 initiates an indicator as instructed by the native application 108. The indicator 118 may be of various forms. For example, and not by way of limitation, the indicator may be a visual, haptic, or audible indicator to indicate that a function request 111 is being processed by the web control 110.

A visual indicator may be, by way of example and not by way of limitation, an hourglass image showing that an action, such as the function request 111, has been initiated by the native application 108 or the web control 110. A visual indicator may be rendered on top of a display provided by the web control 110. In another configuration, the native application 108 may take a screen capture of the web content provide by the web control 110, display the screen capture, and thereafter display the indicator on top of the screen capture. Once the function request 111 is complete, the screen capture and the indicator may be removed.

Another example may be a haptic indicator, which may be, by way of example and not by way of limitation, a vibration of the computing device 102. An audible indicator may be, by way of example and not by way of limitation, a ringtone or music. It should be appreciated that the indicator may be a combination of more than one visual, haptic, or audible indicator. For example, and not by way of limitation, the indicator may be a combination of several visual indicators or may be a combination of a visual indicator and a haptic indicator.

When the function request 111 is completed, the native indicator 118 may receive an instruction to either remove a previously initiated indication or to initiate an additional indication. For example, and not by way of limitation, the native indicator 118 may have rendered and maintained a visual indicator in the form of an hourglass image. When the native indicator 118 receives an instruction that the function request 111 is complete, the native indicator 118 may remove the hourglass.

In another example, the native indicator 118 may be instructed to provide an additional indicator such as vibrating the computing device 102 to notify the user that the function request 111 is complete. In conjunction with the native indicator 118 receiving an instruction to either remove a previously initiated indication or to initiate an additional indication, the application state control 116 may return the visual level from the native application 108 to the web control 110, thus changing the application state from the native application 108 to the web control 110. The web control 110 thereafter may have the relatively higher visual level when compared to the native application 108.

Figure 2A:
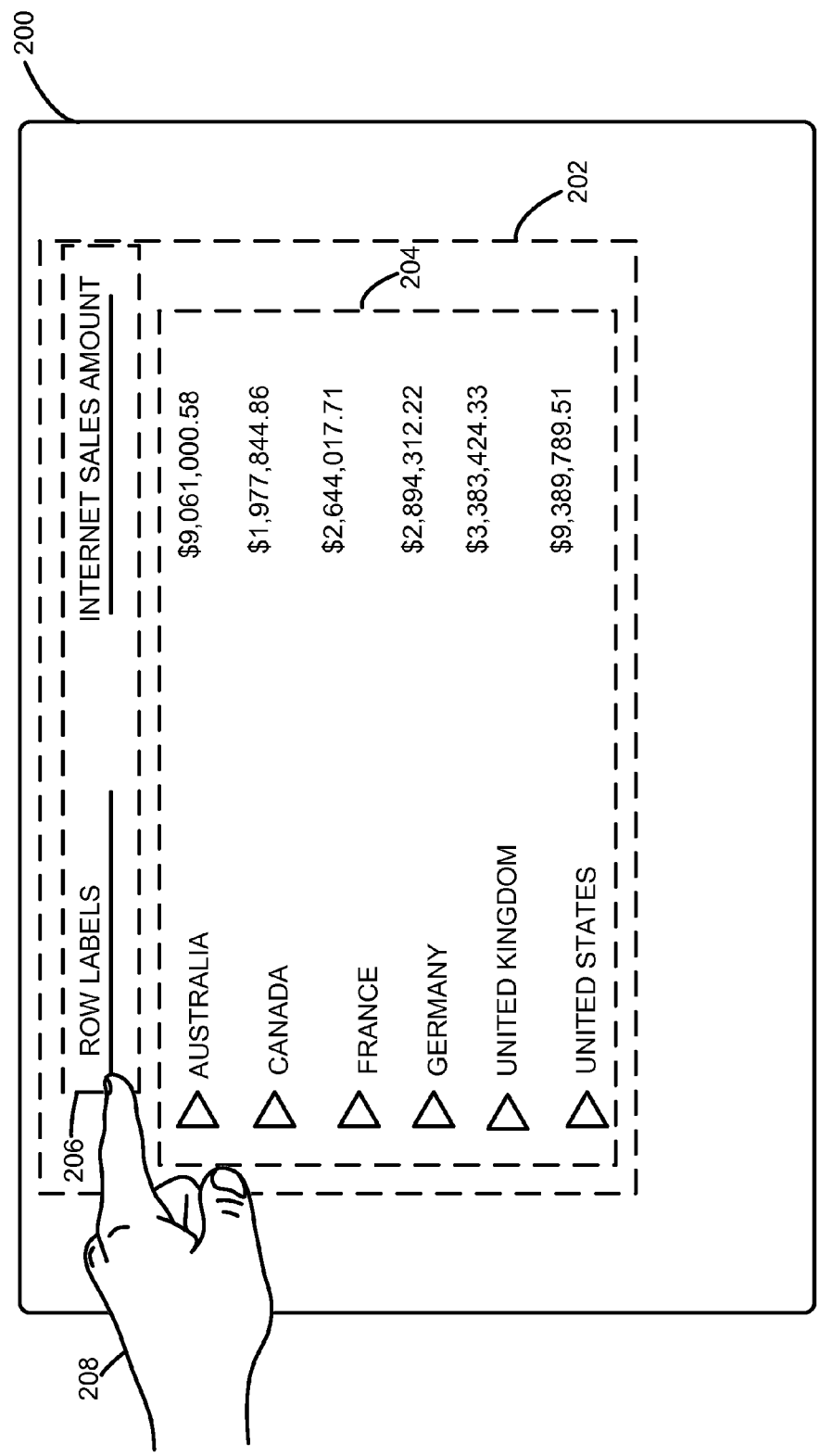
FIGS. 2A-2C are illustrative screen diagrams illustrating aspects of a display showing the transfer of visual control from a web control to a native application, in accordance with some embodiments.
Figure 2B:
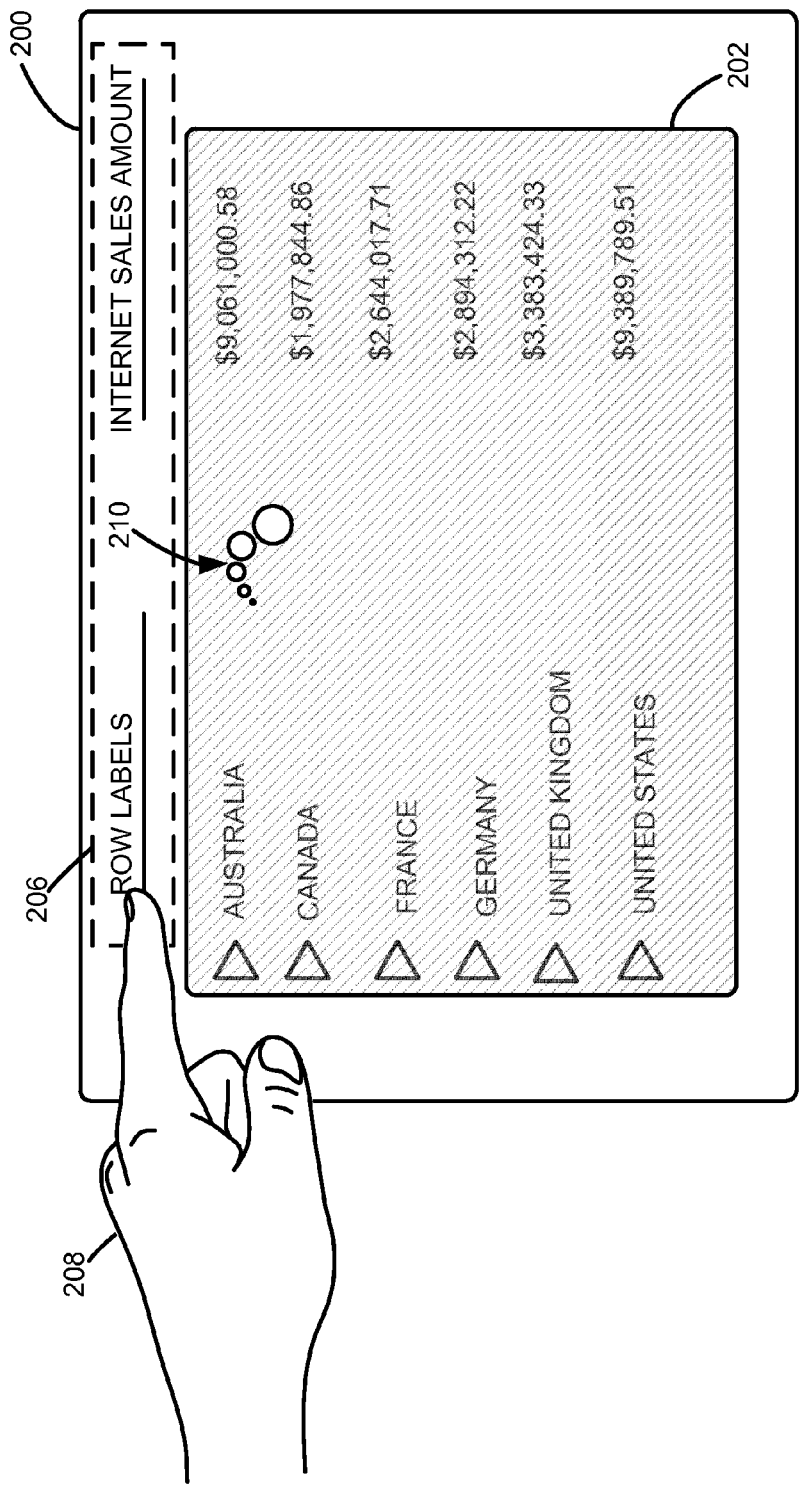
Figure 2C:
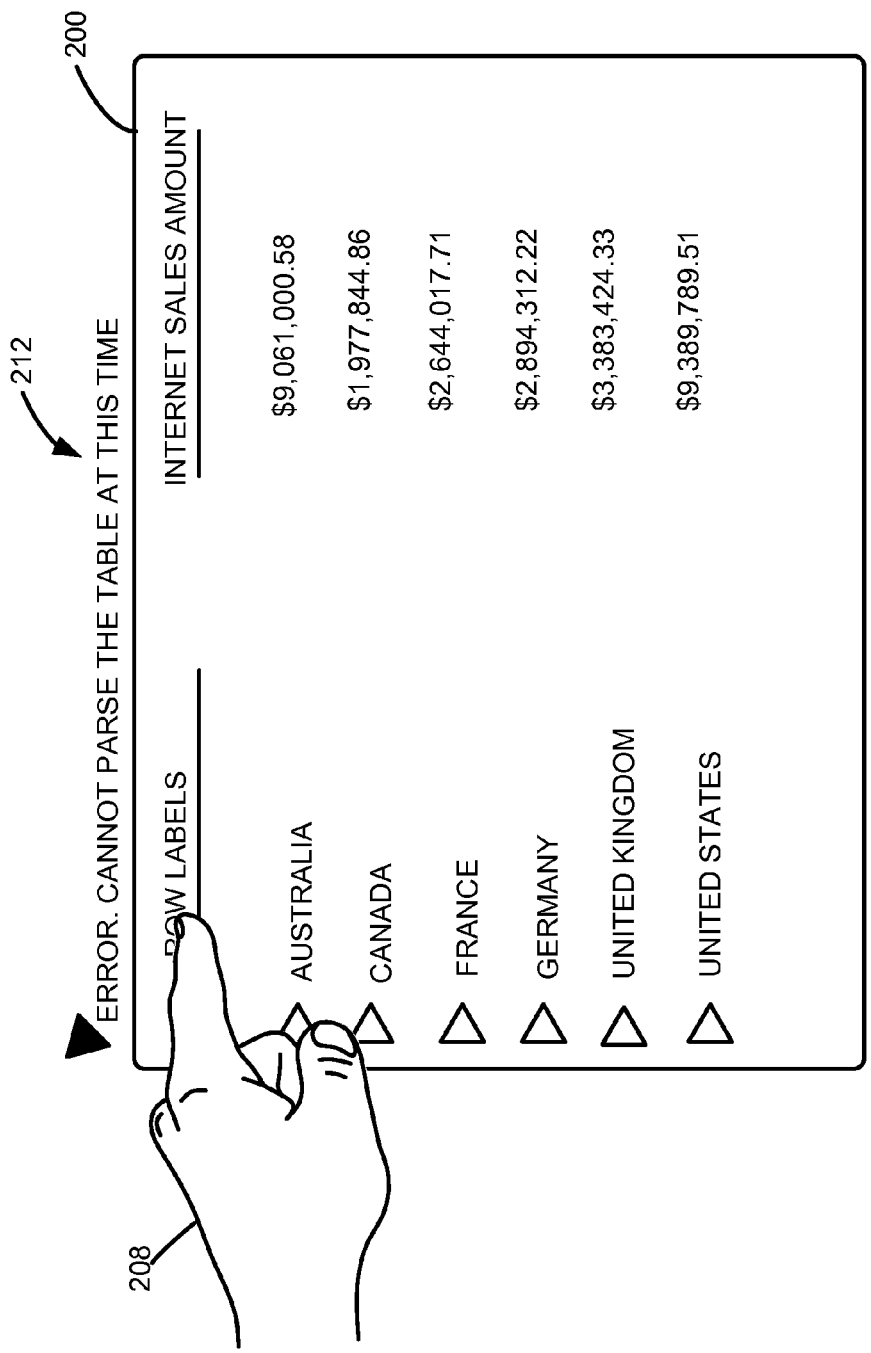

FIGS. 2A-2C are illustrative screen diagrams of a display 200 showing the transfer of visual control from a web control 110 to a native application 108. The display 200 has rendered thereon web content 202. The web content 202 may be obtained from various sources, including the content data store 114. The web content 202 may be rendered by the web control 110. The web content 202 may be rendered with data 204 that may be viewed by a user. The web content 202 may also be rendered with user interface controls 206 that may be used to interact with the web content 202.

As discussed above, the application state control 116 may transfer the visual level from the web control 110 to the native application 108 when a function request 111 is initiated. In one example, a function request 111 may be initiated when the native application 108 or the web control 110 receives an input that a user 208 selects one of the user interface controls 206 entitled, "ROW LABELS." In that example, the function request 111 may be a request to sort the information. The function request 111 may also be initiated in a similar manner when the native application 108 or the web control 110 receives an input that the user 208 selects one of the user interface controls 206 entitled, "INTERNET SALES AMOUNT."

These and other actions may initiate the function request 111. The function request 111 can also be generated through other processes, the present disclosure of which is not limited to any particular source from which the function request 111 is initiated. For example, the function request 111 may be initiated by the native application 108 or the web control 110 without user input in response to another input, such as refreshing the display 200. If the native application 108 receives an input that initiates the function request 111 from the server 112, the application state control 116 may transfer the visual level from the web control 110 to the native application, as shown by way of example in FIGS. 2B and 2C.

FIG. 2B is an illustrative screen diagram of the display 200 after the native application 108 or the web control 110 receives an input that the user 208 has selected one of the user interface controls 206. The web control 110 may determine that the selection may require an indicator to show the user 208 that the web control 110 is issuing the function request 111. In this example, the application state control 116 may transfer the visual level to the native application 108. The native application 108 may determine that an indicator may be required or desired. Thus, the native application 108 may direct the native indicator 118 to initiate one or more indicators. In the present example, the indicator includes a timer indicator 210 to indicate that time is required to process the function request 111. The indicator may also include a shading of the display area for the web content 202. Once the function request 111 is complete, the application state control 116 may return the visual level back to the web control 110.

FIG. 2C is an illustrative screen diagram of the display showing a different indicator. In FIG. 2C, the native application 108 or the web control 110 has received an input that the user 208 has selected one of the user interface controls 206. In a manner different than illustrated in FIG. 2B, the function request 111 cannot be performed by the server 112 or another error has occurred. Thus, in this example, the native indicator 118 may provide an error indicator 212, intended to provide information to the user 208 that an error has occurred. The native indicator 118 may maintain the error indicator 212 or may remove the error indicator 212 as directed by the application state control 116.

Figure 3:
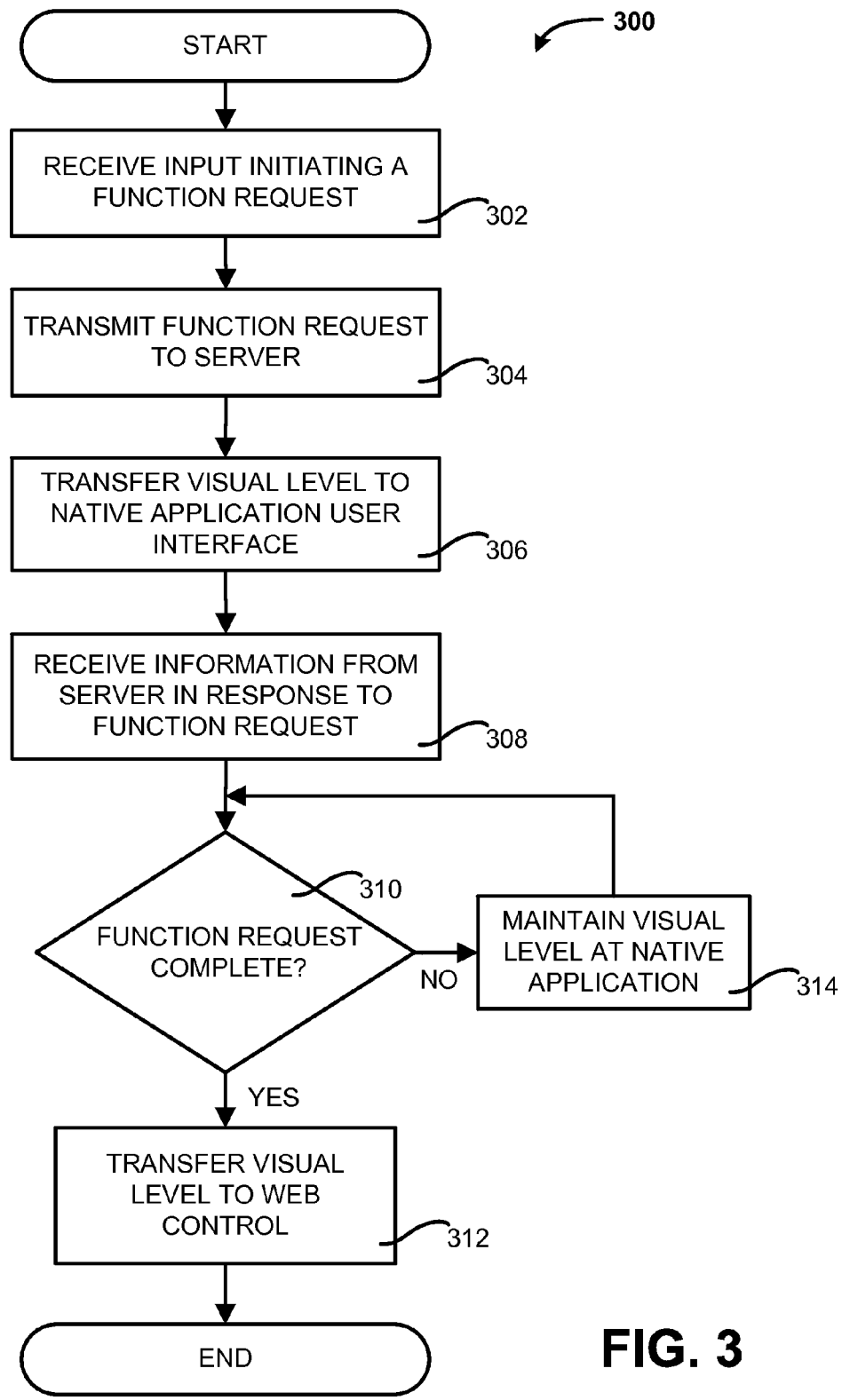
FIG. 3 is a flow diagram showing aspects of a method for transferring application state between a web control and a native application, in accordance with some embodiments.

FIG. 3 is a flow diagram showing aspects of a method 300 for transferring application state control between a web control 110 rendered by a native application 108 to native indicators 118 provided by the native application 108, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The operations of the method 300 are described herein below as being implemented, at least in part, by the native application 108, the web control 110, the application state control 116, the native indicator 118, and the server 112, or combinations thereof. One or more of the operations of the method 300 may alternatively or additionally be implemented, at least in part, by the similar components in either computing device 102 or a similarly configured server computer.

The method 300 begins at operation 302, where an input is received to initiate the function request 111. The input may be received from various sources, including an input by the user 208. For example, the user 208 may select one or more user interface controls 206 that initiate the function request 111. The function request 111 may be a request transmitted from the computing device 102 to the server 112 to instruct the server 112 to, among other possibilities, perform a function, provide data, and the like.

The method 300 proceeds to operation 304, where the function request 111 is transmitted. The function request 111 may be transmitted to the server 112. The function request 111 may be transmitted by the web control 110 acting as an embedded application within the native application 108, acting as an agent of or at the direction of the native application 108, or by the native application 108. The presently disclosed subject matter is not limited to which entity or the manner in which the function request 111 is transmitted.

The method 300 proceeds to operation 306, where the application state is transferred to a user interface or display provided by the native application 108. The application state is transferred by the application state control 116 of the native application 108 from the application state of the web control 110. The transfer of the application state may include various types of indicators. For example, the transfer of the application state may include indicators such as the timer indicator 210, as illustrated in FIG. 2B, or the error indicator 212, as illustrated in FIG. 2C. Indicators may also include other types of visual indicators, haptic indicators or audio indicators, or various combinations thereof.

The method 300 proceeds to operation 308, where the native application 108 or the web control 110 receives information from the server 112 in response to the function request 111. The information may include, among other things, data such as text, numbers, and the like. The information may also include status updates or notices to indicate that the function request 111 has been received and is being processed.

The method 300 proceeds to operation 310, where a determination is made as to whether or not the function request 111 is complete. At this point in the method 300, the application state is at the native application 108 level, whereby the native application 108 is providing all or some of the user interfaces or displays. The information to make the determination at operation 310 may be received from the server 112 or may be generated by another entity, such as the native application 108, the web control 110, or another entity.

In response to a determination that the function request 111 is complete at operation 310, the method 300 proceeds to operation 312, where the application state is transferred from the native application 108 back to the web control 110. As discussed above, the application state, when either at the web control 110 or the native application 108, may include user interfaces or other display information from either the web control 110 or the native application 108. The method 300 thereafter ends.

In response to a determination that the function request 111 is complete at operation 310, the method 300 proceeds to operation 314, where the application state is maintained at the native application 108. The native application 108 may make periodic inquiries to the server 112 to determine the status of the function request 111. The native application 108 may also be configured to wait a certain period of time to receive a notice from the server 112 indicating that the function request 111 has been completed. The native application 108 may periodically determination whether or not the function request 111 is complete at operation 310. If the function request 111 is completed, the method proceeds to operation 312 as indicated above and thereafter ends.

Figure 4:
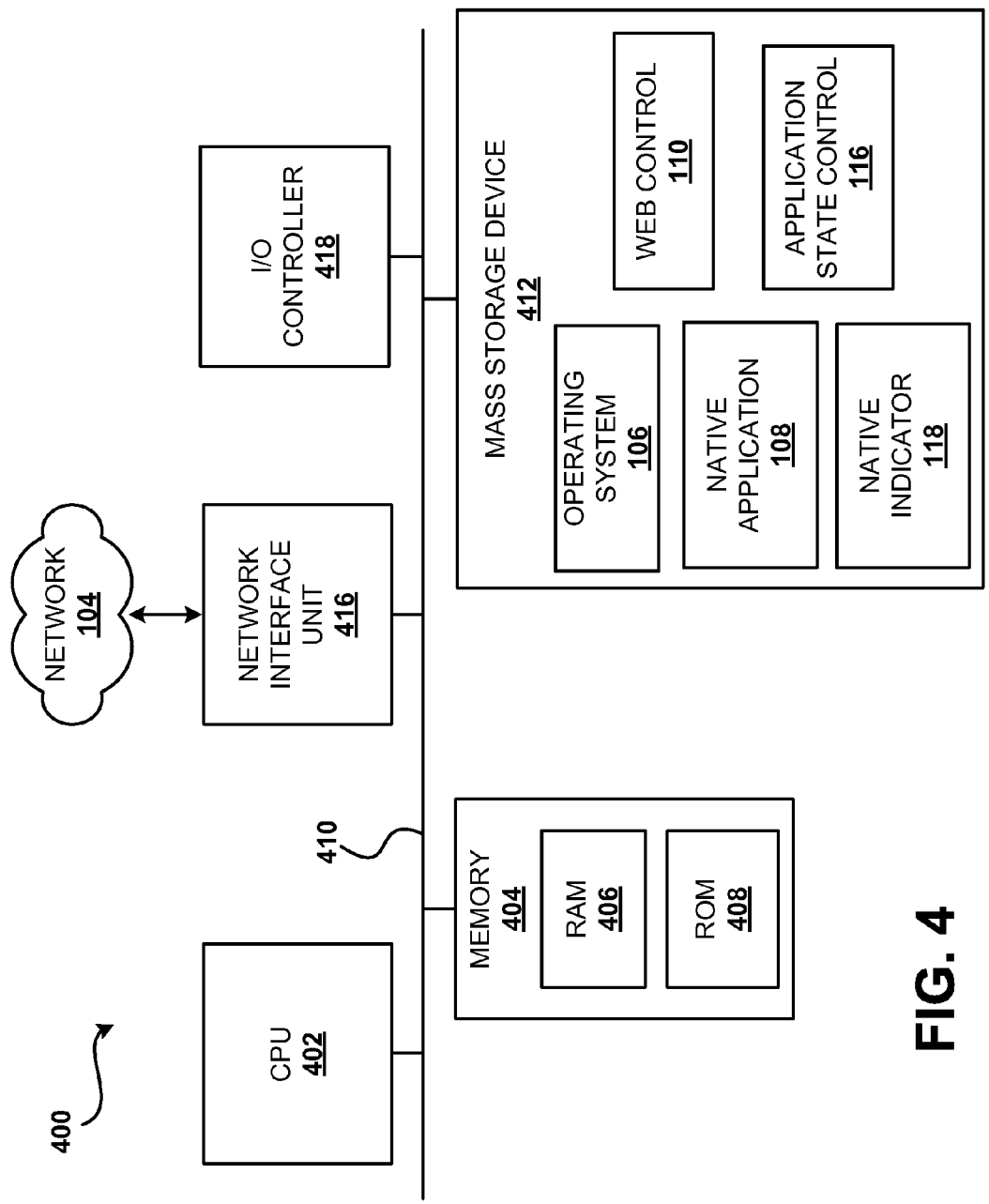
FIG. 4 is a computer architecture diagram showing aspects of a device capable of executing the software components presented herein, in accordance with some embodiments.

FIG. 4 illustrates an illustrative computer architecture 400 for a device capable of executing the software components described herein for providing the concepts and technologies described herein. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit ("CPU") 402, a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106 from FIG. 1 and one or more application programs including, but not limited to, the native application 108, the web control 110, the application state control 116, and the native indicator 118.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for the non-transitory storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 400. For purposes of the claims, the phrase "computer storage medium," and variations thereof, does not include waves or signals per se and/or communication media.

According to various embodiments, the computer architecture 400 may operate in a networked environment using logical connections to remote computers through a network such as the network 104. The computer architecture 400 may connect to the network 104 through a network interface unit 416 connected to the bus 410. It should be appreciated that the network interface unit 416 also may be utilized to connect to other types of networks and remote computer systems. The computer architecture 400 also may include an input/output controller 418 for receiving and processing input from a number of other devices, including a keyboard, mouse, or electronic stylus (illustrated by way of example in FIG. 4). Similarly, the input/output controller 418 may provide output to a display screen, a printer, or other type of output device.

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
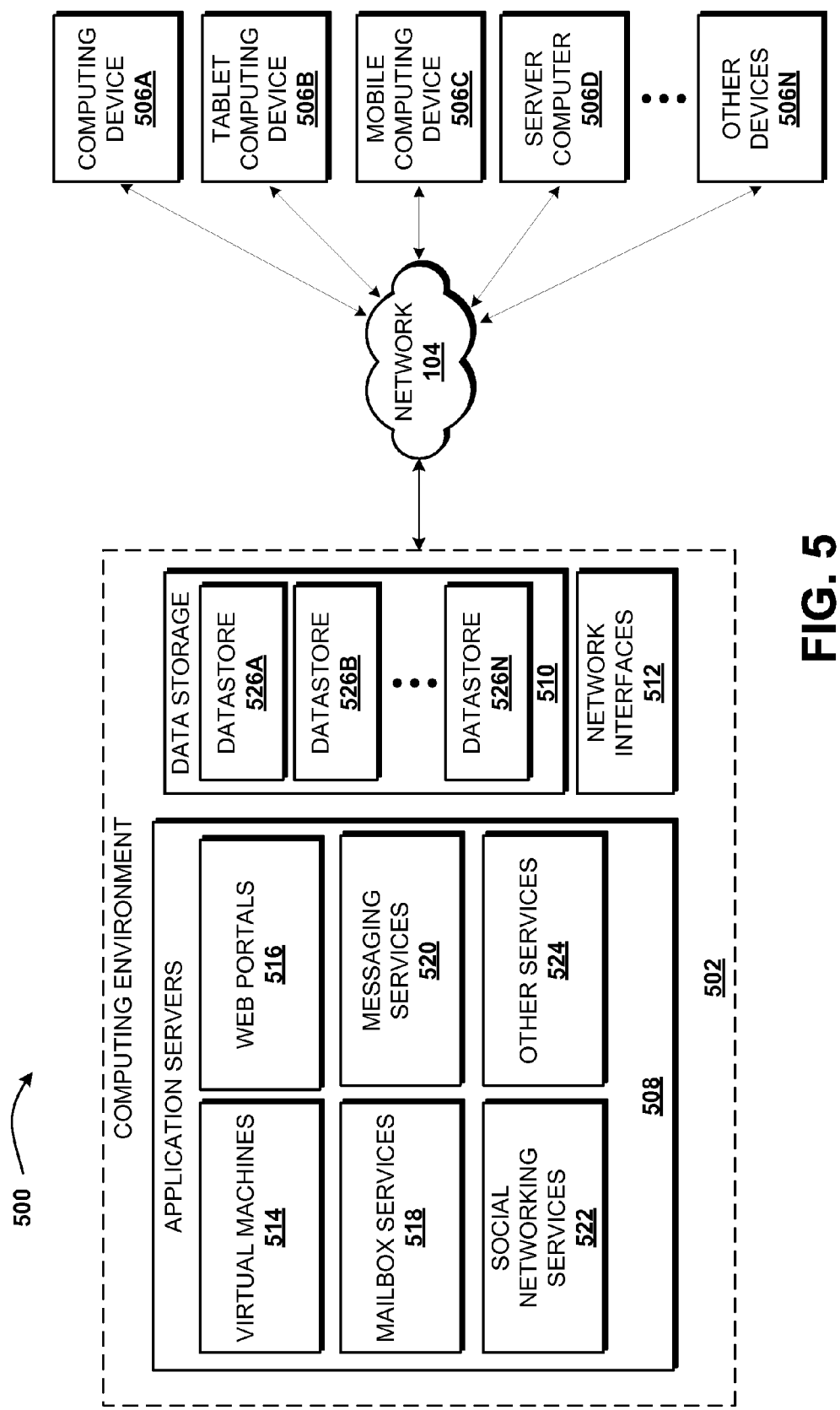
FIG. 5 is a network diagram illustrating aspects of a distributed computing environment capable of implementing aspects of the embodiments presented herein, in accordance with some embodiments.

FIG. 5 illustrates an illustrative distributed computing environment 500 capable of executing the software components described herein for searching for providing the concepts and technologies described herein. Thus, the distributed computing environment 500 illustrated in FIG. 5 can be used to provide the functionality described herein. The distributed computing environment 500 thus may be utilized to execute any aspects of the software components presented herein.

According to various implementations, the distributed computing environment 500 includes a computing environment 502 operating on, in communication with, or as part of the network 104. The network 104 also can include various access networks. One or more client devices 506A-506N (hereinafter referred to collectively and/or generically as "clients 506") can communicate with the computing environment 502 via the network 104 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above embodiments are illustrative, and should not be construed as being limited in any way.

As shown in FIG. 5, the application servers 508 also can host other services, applications, portals, and/or other resources ("other resources") 524. The other resources 524 can include, but are not limited to, the native application 108, the web control 110, the application state control 116, and the native indicator 118. It thus can be appreciated that the computing environment 502 can provide integration of the concepts and technologies disclosed herein with various mailbox, messaging, social networking, and/or other services or resources.

As mentioned above, the computing environment 502 can include the data storage 510. According to various implementations, the functionality of the data storage 510 is provided by one or more data stores operating on, or in communication with, the network 104. The functionality of the data storage 510 also can be provided by one or more server computers configured to host data for the computing environment 502. The data storage 510 can include, host, or provide one or more real or virtual data stores 526A-526N (hereinafter referred to collectively and/or generically as "data stores 526"). The data stores 526 are configured to host data used or created by the application servers 508 and/or other data. Although not illustrated in FIG. 5, the data stores 526 also can host or store data stores 224A-224N in data store 224 shown in FIG. 2.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein.

Figure 6:
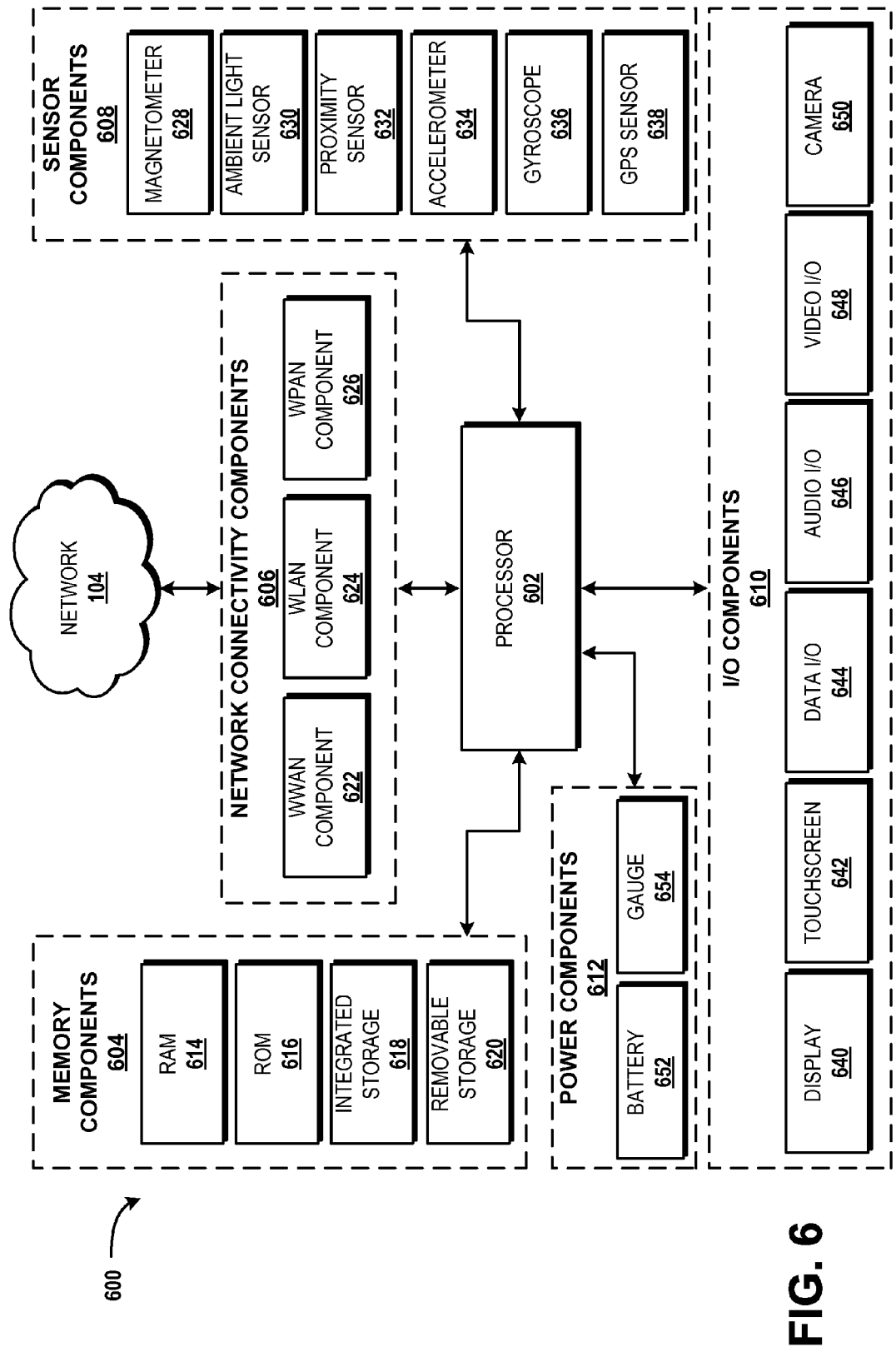
FIG. 6 is a computer architecture diagram illustrating aspects of a computing device architecture capable of implementing aspects of the embodiments presented herein.

Turning now to FIG. 6, an illustrative computing device architecture 600 for a computing device that is capable of executing various software components described herein for transferring application state control between a web control rendered by a native application to native indicators provided by the native application. The computing device architecture 600 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 600 is applicable to any of the clients 506 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output ("I/O") components 610, and power components 612. In the illustrated embodiment, the processor 602 is in communication with the memory components 604, the network connectivity components 606, the sensor components 608, the I/O components 610, and the power components 612. Although no connections are shown between the individuals components illustrated in FIG. 6, the components can interact to carry out device functions. In some embodiments, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some embodiments, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some embodiments, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some embodiments, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some embodiments, the RAM 614 or a portion thereof, the ROM 616 or a portion thereof, and/or some combination the RAM 614 and the ROM 616 is integrated in the processor 602. In some embodiments, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some embodiments, the removable storage 620 is provided in lieu of the integrated storage 618. In other embodiments, the removable storage 620 is provided as additional optional storage. In some embodiments, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 104, which may be a WWAN, a WLAN, or a WPAN. Although a single network 104 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN.

The network 104 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 104 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 104 may be configured to or adapted to provide voice and/or data communications in accordance with future generation technologies.

In some embodiments, the WWAN component 622 is configured to provide dual-multi-mode connectivity to the network 104. For example, the WWAN component 622 may be configured to provide connectivity to the network 104, wherein the network 104 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 104 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 624 is configured to connect to the network 104 via the WI-FI access points. Such connections may be secured via various encryption technologies including, but not limited, WI-FI Protected Access ("WPA"), WPA2, Wired Equivalent Privacy ("WEP"), and the like.

The network 104 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some embodiments the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some embodiments, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some embodiments, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 632 are contemplated.

The accelerometer 634 is configured to measure proper acceleration. In some embodiments, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some embodiments, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some embodiments, output from the gyroscope 636 is used by an application program as an input mechanism to control some functionality of the application program. For example, the gyroscope 636 can be used for accurate recognition of movement within a video game application or some other application. In some embodiments, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some embodiments, the display 640 and the touchscreen 642 are combined. In some embodiments two or more of the data I/O component 644, the audio I/O interface component 646, and the video I/O component 648 are combined. The I/O components 610 may include discrete processors configured to support the various interface described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 640 is a liquid crystal display ("LCD") utilizing any active or passive matrix technology and any backlighting technology (if used). In some embodiments, the display 640 is an organic light emitting diode ("OLED") display. Other display types are contemplated.

The touchscreen 642 is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 642 is incorporated on top of the display 640 as a transparent layer to enable a user to use one or more touches to interact with objects or other information presented on the display 640. In other embodiments, the touchscreen 642 is a touch pad incorporated on a surface of the computing device that does not include the display 640. For example, the computing device may have a touchscreen incorporated on top of the display 640 and a touch pad on a surface opposite the display 640.

In some embodiments, the touchscreen 642 is a single-touch touchscreen. In other embodiments, the touchscreen 642 is a multi-touch touchscreen. In some embodiments, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some embodiments, the touchscreen 642 supports a tap gesture in which a user taps the touchscreen 642 once on an item presented on the display 640. The tap gesture may be used for various reasons including, but not limited to, opening or launching whatever the user taps. In some embodiments, the touchscreen 642 supports a double tap gesture in which a user taps the touchscreen 642 twice on an item presented on the display 640. The double tap gesture may be used for various reasons including, but not limited to, zooming in or zooming out in stages. In some embodiments, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some embodiments, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some embodiments, the touchscreen 642 supports a flick gesture in which a user swipes a finger in the direction the user wants the screen to move. The flick gesture may be used for various reasons including, but not limited to, scrolling horizontally or vertically through menus or pages. In some embodiments, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some embodiments, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 646 is configured to provide audio input and/or output capabilities to the computing device. In some embodiments, the audio I/O interface component 644 includes a microphone configured to collect audio signals. In some embodiments, the audio I/O interface component 644 includes a headphone jack configured to provide connectivity for headphones or other external speakers. In some embodiments, the audio I/O interface component 646 includes a speaker for the output of audio signals. In some embodiments, the audio I/O interface component 644 includes an optical audio cable out.

The video I/O interface component 648 is configured to provide video input and/or output capabilities to the computing device. In some embodiments, the video I/O interface component 648 includes a video connector configured to receive video as input from another device (e.g., a video media player such as a DVD or BLURAY player) or send video as output to another device (e.g., a monitor, a television, or some other external display). In some embodiments, the video I/O interface component 648 includes a High-Definition Multimedia Interface ("HDMI"), mini-HDMI, micro-HDMI, DisplayPort, or proprietary connector to input/output video content. In some embodiments, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some embodiments, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some embodiments, the battery gauge 654 is configured to measure the effect of a battery's discharge rate, temperature, age and other factors to predict remaining life within a certain percentage of error. In some embodiments, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component (not illustrated).

Based on the foregoing, it should be appreciated that concepts and technologies for transferring application state control between a web control rendered by a native application to native indicators provided by the native application have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for transferring application state control comprising:
   receiving an input to initiate a function request at a web control of a native application, wherein the web control is configured to render data stored in a content data store;
   transmitting the function request in response to the input;
   transferring an application state of the native application from the web control to the native application;
   initiating a native indicator;
   receiving information in response to the function request; and
   transferring the application state of the native application from the native application to the web control, wherein the native indicator is rendered in a foreground when the application state of the native application is transferred from the web control to the native application and the web control is rendered in the foreground when the application state of the native application is transferred from the native application to the web control.

2. The computer-implemented method of claim 1, wherein the native indicator comprises a visual, haptic or audible indicator.

3. The computer-implemented method of claim 1, wherein transferring the application state of the native application from the native application to the web control comprises determining if the function request is complete.

4. The computer-implemented method of claim 1, further comprising maintaining the application state of the native application at the native application in response to determining that the function request is not complete.

5. The computer-implemented method of claim 1, initiating the native indicator comprises transferring the control of visual information rendered in a display from the web control to the native application.

6. The computer-implemented method of claim 1, wherein the web control is configured to facilitate an interaction between the native application and a server.

7. An optical disk, a magnetic storage device, or a solid state storage device having computer readable instructions stored thereon which, when executed by a computer, cause the computer to:
   execute a native application;
   execute a web control embedded in the native application;
   receive an input to perform a function request operation;
   transfer an application state to the native application during the function request operation;
   initiate a native indicator; and
   transfer the application state to the web control when the function request operation is not being performed, wherein the native indicator is rendered in a foreground when the application state of the native application is transferred from the web control to the native application and the web control is rendered in the foreground when the application state of the native application is transferred from the native application to the web control.

8. The optical disk, the magnetic storage device, or the solid state storage device of claim 7, further comprising computer readable instructions which, when executed by the computer, cause the computer to execute an application state control configured to control the transfer of the application state to the native application during the function request operation and the transfer of the application state to the web control when the function request operation is not being performed.

9. The optical disk, the magnetic storage device, or the solid state storage device of claim 7, wherein the native indicator is a visual, haptic or audible indicator.

10. The optical disk, the magnetic storage device, or the solid state storage device of claim 7, further comprising computer readable instructions which, when executed by the computer, cause the computer to receive the input at a user interface control.

11. The optical disk, the magnetic storage device, or the solid state storage device of claim 7, further comprising computer readable instructions which, when executed by the computer, cause the computer to receive information in response to the function request.

12. The optical disk, the magnetic storage device, or the solid state storage device of claim 7, further comprising computer readable instructions which, when executed by the computer, cause the computer to determine if the function request operation is complete.

13. The optical disk, the magnetic storage device, or the solid state storage device of claim 12, further comprising computer readable instructions which, when executed by the computer, cause the computer to maintain the application state of the native application at the native application in response to determining that the function request is not complete.

14. The optical disk, the magnetic storage device, or the solid state storage device of claim 7, wherein the web control is configured to facilitate an interaction between the native application and a server.

15. A computer, comprising:
a processor; and
a computer-readable storage medium in communication with the processor, the computer-readable storage medium having computer-executable instructions stored thereupon which, when executed by the processor, cause the processor to
  execute a native application, execute a web control embedded in the native application,
  receive an input to perform a function request operation,
  execute an application state control configured to control a transfer of an application state to the native application during the function request operation and a transfer of the application state to the web control when the function request operation is not being performed,
  receive information in response to the function request operation, and
  initiate a native indicator from the native application during the function request operation, wherein the native indicator is rendered in a foreground when the application state of the native application is transferred from the web control to the native application and the web control is rendered in the foreground when the application state of the native application is transferred from the native application to the web control.

16. The computer of claim 15, wherein the native indicator is a visual, haptic or audible indicator.

* * * * *